United States Patent
MacLennan et al.

(10) Patent No.: US 6,725,758 B2
(45) Date of Patent: Apr. 27, 2004

(54) OVERLAPPING INSERT FOR CUTTING TOOTH

(76) Inventors: Charles D. MacLennan, 153 Cote St-Charles, Hudson Heights (CA), J0P 1J0; Nick Palfy, 2404 Hémon, Chomedey, Quebec (CA), H7T 2P4

(*) Notice: Subject to any disclaimer, the term of this patent is extended or adjusted under 35 U.S.C. 154(b) by 0 days.

(21) Appl. No.: 10/114,486

(22) Filed: Apr. 3, 2002

(65) Prior Publication Data

US 2003/0188619 A1 Oct. 9, 2003

(51) Int. Cl.[7] .............................................. B27B 33/02
(52) U.S. Cl. .................................... 83/839; 83/848
(58) Field of Search ................ 83/835–855; 407/40, 407/41, 102; 144/34.1, 228

(56) References Cited

U.S. PATENT DOCUMENTS

| | | | | |
|---|---|---|---|---|
| 4,318,645 A | * | 3/1982 | McCreery | 407/114 |
| 5,199,827 A | * | 4/1993 | Pantzar | 407/42 |
| 5,207,748 A | * | 5/1993 | Katbi et al. | 407/114 |
| 5,647,263 A | * | 7/1997 | Wildey | 83/835 |
| 5,702,210 A | * | 12/1997 | Boianjiu | 407/100 |
| 5,813,308 A | * | 9/1998 | Wildey et al. | 83/835 |
| 6,050,752 A | * | 4/2000 | DeRoche | 407/114 |

* cited by examiner

*Primary Examiner*—Allan N. Shoap
*Assistant Examiner*—Phong Nguyen
(74) *Attorney, Agent, or Firm*—Ogilvy Renault

(57) ABSTRACT

A saw tooth for a circular saw for a feller includes, in one embodiment, a square saw tooth body having a multi-faceted shape to be mounted on a holder and for receiving inserts fastened to inwardly sloping seating surfaces on the cutting end of the tooth body. The inserts are provided with cutting tips and cutting edges to form angled cutting edges about the entire periphery of the cutting end of the tooth body. Notches are made in the seating surfaces and inserts in order to permit adjacent inserts to overlap one another, such that the angled cutting edges are strengthened at their junctions, thereby reducing damage of the inserts and improving the cutting performance of the saw tooth.

12 Claims, 3 Drawing Sheets

OVERLAPPING INSERT FOR CUTTING TOOTH

FIELD OF THE INVENTION

The present invention relates to an improved saw tooth for circular saws, and more particularly, to a saw tooth having inserts to provide multiple angled cutting edges.

BACKGROUND OF THE INVENTION

Saw teeth for circular saws of the type mounted on a feller head for a tree felling apparatus have undergone considerable change in the last few years.

U.S. Pat. No. 4,932,447, Morin, 1990, and U.S. Pat. No. 5,205,199, MacLennan, 1993, represent saw teeth which have become the standards in the industry. Morin '447 and MacLennan '199 both teach a replaceable saw tooth with four sides which can be rotated when the active cutting tips and edges become dull or worn. The saw tooth generally has a four-sided main body with a mounting end and a cutting end. The MacLennan patent further provides V-shaped cutting edges at the cutting end, with four planar surfaces defining cutting tips at the apex of these somewhat triangular surfaces. Flat triangular carbide inserts can overlie the flat surfaces to reinforce the cutting edges. These inserts are brazed to the tooth head.

MacLennan et al, in their U.S. Pat. No. 5,644,965, 1997, describe an improved saw tooth having V-shaped cutting edges. The four-sided main body of the saw tooth includes seats for receiving inserts. The inserts which are made of hardened material are provided with cutting tips and cutting edges and are retained against the main body by a clamp nut. Thus, when the edges and tips are worn or damaged from impact, the inserts can be replaced without rotating the tooth. The tooth is rotated only when the seat of the main body is damaged.

The saw tooth, which has fixed or replaceable hardened inserts forming V-shaped cutting edges, provides good cutting performance. However, it should be noted that in those prior art saw teeth, adjacent inserts abut each other, thereby forming weak points at the junction of the respective V-shaped cutting edges. In a worst case scenario, a slight gap may exist between adjacent inserts and, therefore, the V-shaped cutting edges are not actually continuous at those junctions thereof, which will adversely affect the cutting performance of the saw tooth.

In U.S. Pat. No. 5,307,719, issued on May 3, 1994, MacLennan describes a saw tooth similar to those described in U.S. Pat. No. 5,205,199. The improvement of MacLennan '719 lies in that adjacent insert ends of the hardened inserts overlap at the intersection of the two adjacent surfaces. The overlap of the hardened inserts is provided by forming a V-shaped notch in an end of an edge which is adapted to receive an angled end of an edge of an adjacent hardened insert. However, because it is limited by the thickness and angled position of the hardened inserts, the V-shaped notch only provides very limited space for the overlap. Therefore, such an overlap configuration cannot significantly prevent weakened areas in the cutting end of the tooth.

There is a need for improved configuration of the saw tooth having inserts forming V-shaped cutting edges, to overcome these shortcomings.

SUMMARY OF THE INVENTION

It is an object of the present invention to provide a saw tooth having inserts forming angled cutting edges about the periphery of a cutting end of the saw tooth, wherein adjacent inserts are overlapped to provide strengthened cutting edges at the junctions of adjacent inserts.

A construction in accordance with the present invention includes a saw tooth for a circular saw blade wherein the tooth comprises a multi-faceted shaped body having a mounting end, a larger cutting end and a plurality of sides extending between the mounting end and the cutting end. The sides form corners at the cutting end where they meet. A seating surface is provided on the cutting end at each of the corners. Each of the seating surfaces slopes inwardly and is defined between two edges diverging from a corresponding corner. A hardened insert is fastened to each seating surface to form a single cutting tip with a pair of receding cutting edges. Adjacent inserts overlap one another and provide angled cutting edges about the entire periphery of the cutting end. A seat-notch in each of the seating surfaces and an insert-notch in each of the inserts are provided so that the seat-notch and the insert-notch in combination form a groove for receiving a section of an adjacent insert, in order to permit the overlapping of adjacent inserts.

The inserts can either be permanently fastened to the tooth head or can be detachably fastened to the tooth head in order to permit the inserts to be replaceable when they are worn or damaged.

Other advantages and features of the present invention will be better understood with reference to the preferred embodiment described hereinafter.

BRIEF DESCRIPTION OF THE DRAWINGS

Having thus generally described the nature of the present invention, reference will now be made to the accompanying drawings, showing by way of illustration the preferred embodiment thereof, in which.

DETAILED DESCRIPTION OF THE PREFERRED EMBODIMENT

Figure 1:
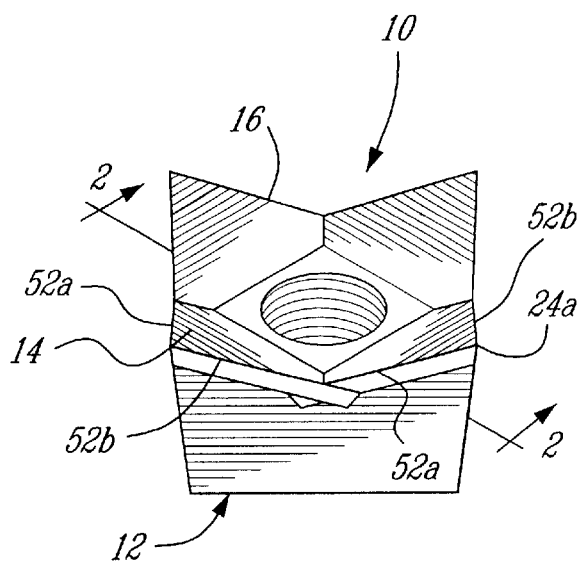
FIG. 1 is a perspective view of an embodiment of a saw tooth in accordance with the present invention.
Figure 2:
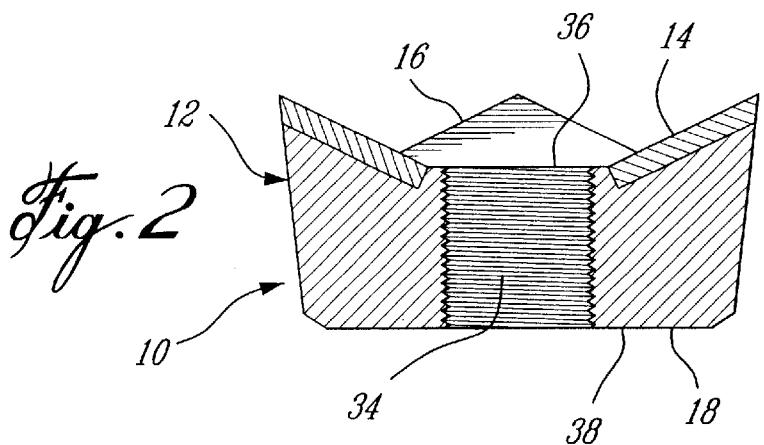
FIG. 2 is a cross-sectional view taken along line 2—2 of FIG. 1.

Referring now the drawings and in particular FIGS. 1 and 2, there is shown a four-sided saw tooth 10 adapted to be mounted on a holder (not shown) which in turn is bolted to the periphery of a circular saw blade used on a de-limber (not shown). The saw tooth 10 includes a tooth body 12 and four inserts 14 fastened to the tooth body 12 in an overlapping relationship with one another and providing angled cutting edges 16 about the periphery of the tooth body 12.

Figure 4:
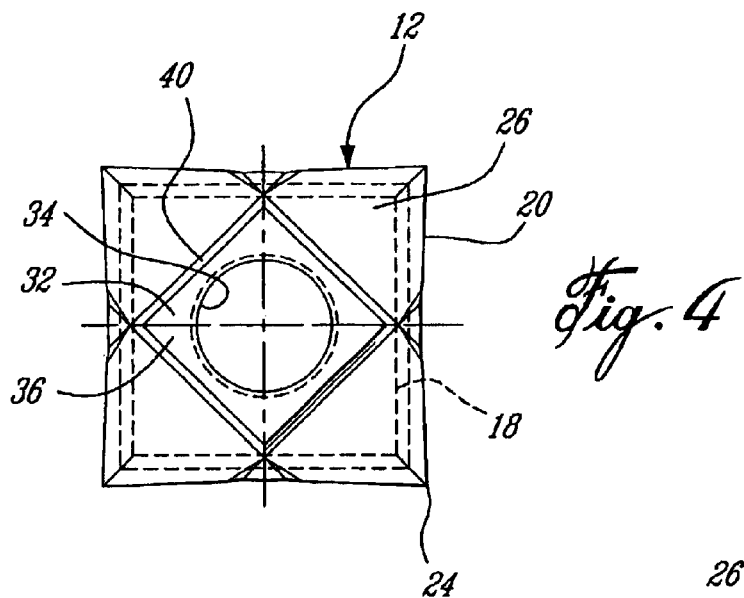
FIG. 4 is a top plan view of a tooth body of the embodiment of FIG. 1.
Figure 5:
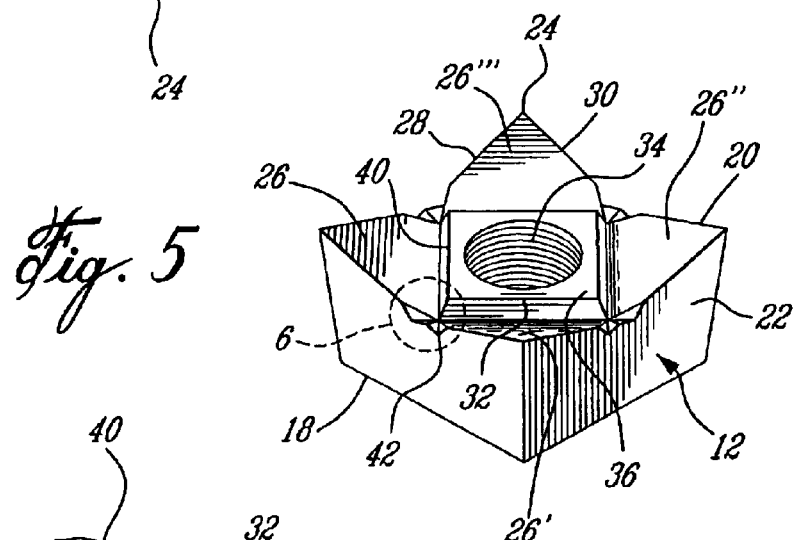
FIG. 5 is a perspective view of the tooth body of FIG. 4.

The tooth body 12, more clearly shown in FIGS. 4 and 5, includes a mounting end 18 and a cutting end 20 with four flat and slightly tapered lateral side walls 22 which extend outwardly from the mounting end 18 to the cutting end 20, forming a frusto-pyramidal configuration. Four corners 24 are formed at the cutting end 20 where the four lateral side walls 22 meet. The cutting end 20 of the tooth body 12 is recessed, as shown in the drawings, and includes flat seating surfaces 26 corresponding to the respective corners 24. Each flat seating surface 26 slopes inwardly and is defined between two straight edges 28, 30, diverging from a corresponding corner 24.

The tooth body 12 further includes a center portion 32 at the cutting end 20 with a center bore 34 extending through the tooth body 12 and through the mounting end 18. The center bore 34 may be provided with inner threads, as shown in the drawings, so that the tooth body 12 can be conveniently secured to the holder of the circular saw blade. The center portion 32 has a front surface 36 which is parallel to a rear surface 38 of the tooth body 12 at the mounting end 18, as shown in FIG. 2. The center portion 32 is defined by four side surfaces 40 extending downward from the front surface 36, perpendicular to and terminating at the respective seating surfaces 26. Thus, each of the seating surfaces 26 is formed in a substantially triangular shape.

Figure 6:
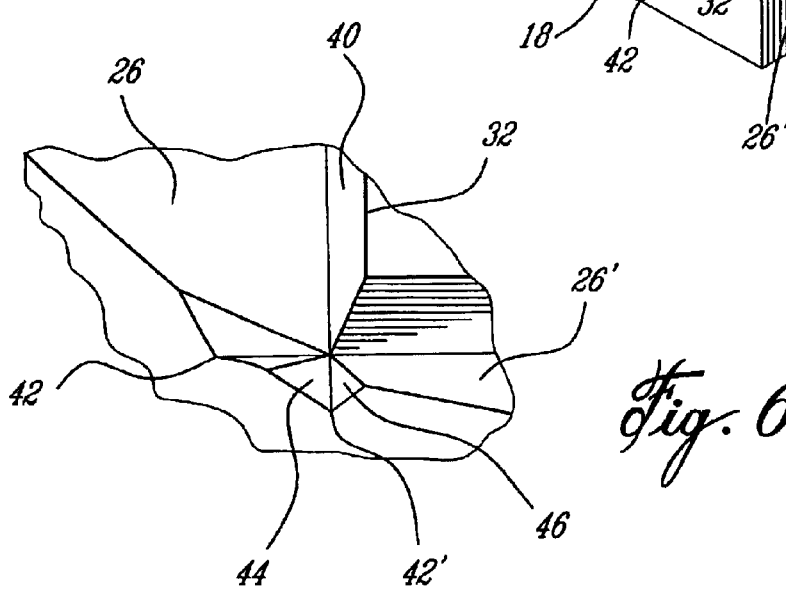
FIG. 6 is an enlarged partial perspective view taken from the circle 6 in FIG. 5, showing the detail of seat-notches.

Each of the substantially triangular seating surfaces 26, 26' intersects at its side corners, the respective adjacent substantially triangular seating surfaces 26, 26' thereby forming a seat-notch 42, 42' in each of the adjacent seating surfaces 26, 26'. Seat-notch 42' in each seating surface 26, 26' which is more clearly shown in FIG. 6, is formed between surface 44 and surface 46. Surface 44 is an extension of an adjacent seating surface 26 and is disrupted by a seat-notch 42 of that adjacent seating surface 26. Surface 46 is on the same plane as one of the side surfaces 40 of the center portion 32. This side surface 40 terminates at and is perpendicular to that adjacent seating surface 26, so that surface 44 is perpendicular to surface 46.

Figure 7A:
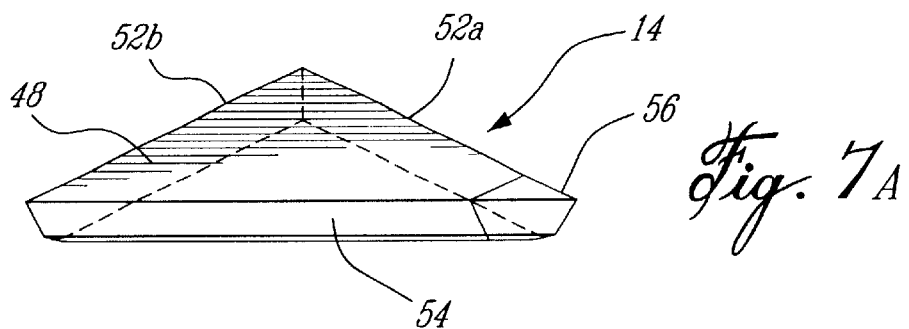
FIG. 7 is a perspective view of a triangular insert to be used in the embodiment of FIG. 1 before one side tip thereof is cut away.
Figure 8:
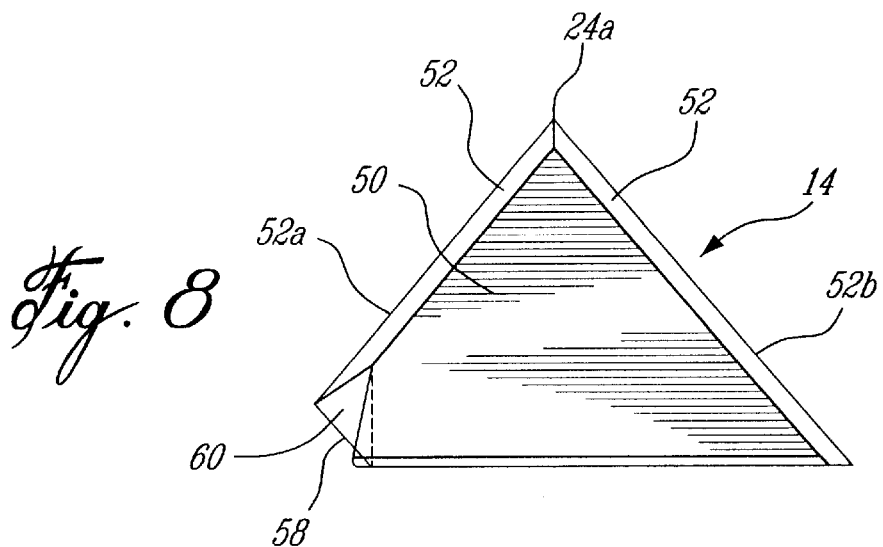
FIG. 8 is a bottom plan view of the insert used in the embodiment of FIG. 1 after one side tip is cut away.
Figure 9:
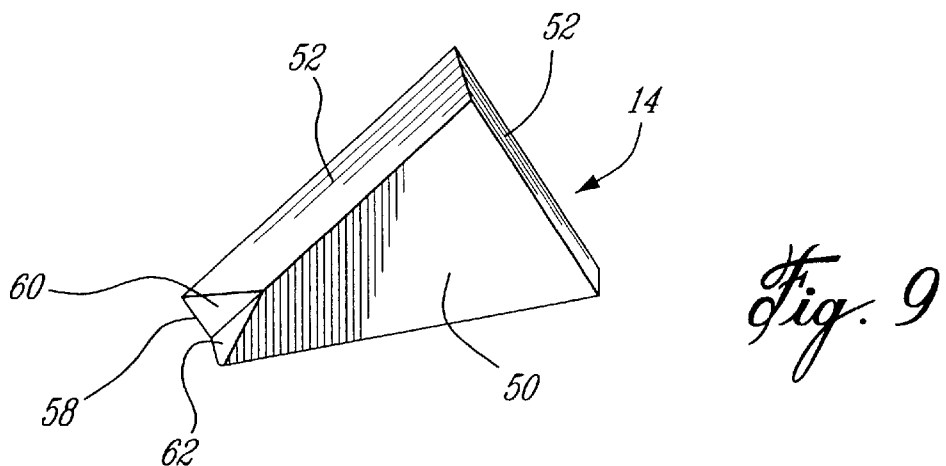
FIG. 9 is a perspective view of the insert of FIG. 8, showing a notch formed therein.

Reference is now made to FIGS. 7–9. Inserts 14 have a uniform size and shape, and each of the inserts 14 is made of a triangular piece of metal having a uniform thickness. Insert 14 includes a top surface 48, a bottom surface 50, two side surfaces 52 and an end surface 54. Bottom surface 50 is slightly smaller than top surface 48, such that the two side surfaces 52 are slightly tapered from the top surface 48 towards the bottom surface 50. The shape and size of inserts 14 correspond to the respective substantially triangular seating surfaces 26 (of FIGS. 4 and 5) in order to ensure that inserts 14 fit into the frusto-pyramidal configuration of tooth body 12, as shown in FIGS. 1 and 2, when inserts 14 are received on the respective seating surfaces 26. The end surface 54 of insert 14, which is perpendicular to top and bottom surfaces 48, 50, rests on the side surface 40 of the center portion 32 of the tooth body 12 when the insert 14 is received on the inwardly sloping seating surface 26 of the tooth body 12. The side surface 40 of the central portion 32, which is right-angled with the inwardly sloping seating surface 26, functions as a stopper to provide accurate positioning for the insert 14 which is to be seated on the seating surface 26.

Figure 3:
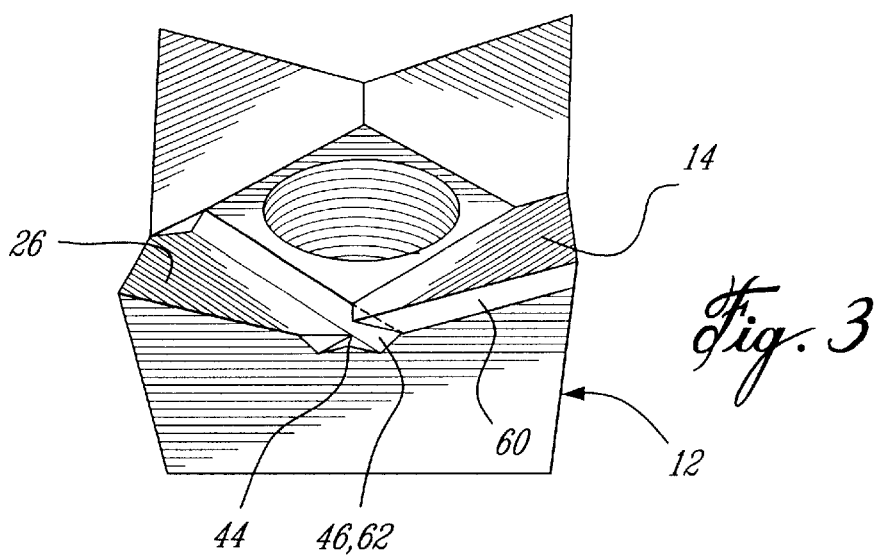
FIG. 3 is a perspective view of the embodiment shown in FIG. 1, with one insert removed.

In order to achieve the overlapping of adjacent inserts 14, one side corner 56 is cut away from each insert 14. The cut side corner 56 can be made at either side of an insert 14 but must be at the same side of every insert 14 which is to be positioned on the same tooth body 12. An insert-notch 58 is formed in the insert 14 after the side corner 56 is cut and removed. The insert-notch 58 of insert 14 includes surfaces 60 and 62 which are perpendicular to each other. Thus, when an insert 14 is received in one seating surface 26 of tooth body 12 and rests on the corresponding side surface 40 of the center portion 32, surface 60 of the insert-notch 58 will be parallel to and spaced apart from surface 44 of the seat-notch 42 in the corresponding seating surface 26, as shown in FIG. 3, and surface 62 of the insert-notch 58 in the insert 14 will be on the same plane as surface 46 of the seat-notch 42 in the corresponding seating surface 26. Thus, as illustrated in FIG. 3, surfaces 44, 46, 60 and 62 in combination form a groove which is slightly wider than the thickness of insert 14, for receiving a significant section of an adjacent insert 14, thereby resulting in the desired overlapping configuration of adjacent inserts 14 fastened to the tooth body 12, as illustrated in FIG. 1.

Referring now to FIGS. 1, 5 and 8, insert 14 fastened to each seating surface 26 of a tooth body 12 will have a pair of cutting edges 52a and 52b which are formed at the intersections of the top surface 48 and the respective side surfaces 52 of the substantially triangular insert 14, and correspond to similarly defined edges of the seating surface 26 of the tooth body 12. A cutting tip 24a of each insert 14 corresponds with the corner 24 of the seating surface 26 to which the insert 14 is fastened. The cutting edges 52a and 52b of each insert 14 recede from the cutting tip 24a. The receding cutting edges 52a, 52b of the respective adjacent inserts 14, as illustrated in FIG. 1, form an angled, or V-shaped, cutting edge at the cutting end 20 on each side of the tooth body 12, thereby providing angled cutting edges about the entire periphery of the cutting end 20 of the tooth body 12.

It should be noted that a significant section of cutting edge 52b extends under cutting edge 52a at each side of the cutting end 20. When a small fraction of cutting edge 52a at its distal extremity relative to its cutting tip 24a is broken under impact during a cutting operation, a corresponding small section of cutting edge 52b, which was overlapped by the broken small fraction of cutting edge 52a, will be exposed so that the cutting performance of this angled cutting edge which is formed by the adjacent overlapping cutting edges 52a and 52b will not immediately be significantly affected.

The inserts 14 may be made of steel or they may be of a hardened material, such as tungsten carbide, depending on the environment in which the tooth is being used. The inserts 14 can be permanently fastened to the tooth body 12, for example, by brazing, as suggested in U.S. Pat. No. 5,205,199. Inserts 14 may also be detachably fastened to the tooth body 12, for example, by a clamp nut which retains the inserts against the tooth body 12, as described in U.S. Pat. No. 5,644,965. It should be noted that the substantially triangular inserts having uniform thickness are used only as an example to illustrate the principle of the invention. The above described overlapping configuration of inserts may be modified and thereby applied to inserts which are not substantially triangular or are not of a uniform thickness. With necessary modifications the overlapping inserts configuration can be applied, for example, to inserts of a somewhat pentagonal outline with uniform thickness and to inserts of a somewhat pentagonal outline with a varying thickness, both described in U.S. Pat. No. 5,644,965, the entire specification of which is incorporated herein by reference.

Other modifications and improvements to the above-described embodiment of the present invention may become apparent to those skilled in the art. The foregoing description is intended to be exemplary rather than limiting. The scope of the invention is, therefore, intended to be limited solely by the scope of the appended claims.

We claim:

1. A saw tooth for a circular saw blade comprising:
   a multi-faceted shaped body having a mounting end, and a larger cutting end and a plurality of sides extending between the mounting end and the cutting end, the sides forming corners at the cutting end where they meet;
   a seating surface on the cutting end at each of the corners, each seating surface sloping inwardly and defined between two edges diverging from a corresponding corner;
   each diverging edge intersecting an adjacent diverging edge from an adjacent other corner so as to form substantially v-shaped edges co-terminus with each side,
   a hardened insert fastened to each seating surface, forming a single cutting tip with a pair of receding cutting edges; and
   each seating surface defining a seat notch at one of the two diverging edges near the intersection with an adjacent divergent edge and each of the inserts including an insert-notch defined in the insert at one of the cutting edges adapted to be aligned with the corresponding seat notch when the insert is installed on the seating surface, the seat-notch and the insert-notch in combination forming a groove for receiving a section of an adjacent insert so that adjacent inserts overlap one another and provide angled cutting edges about the periphery of the cutting end.

2. The saw tooth as claimed in claim 1, wherein the inserts have a uniform thickness and have only flat planes and straight edges.

3. The saw tooth as claimed in claim 1, wherein the inserts are substantially triangular in shape.

4. The saw tooth as claimed in claim 1, wherein the inserts are detachable from the respective seating surfaces.

5. A saw tooth for a circular saw blade comprising:
   a tooth body of frusto-pyramidal configuration, the tooth body having a cutting end, a mounting end, and four flat sides extending therebetween and forming four corners at the cutting end;
   a flat seating surface on the cutting end at each of the corners, each flat seating surface sloping inwardly and being defined between two edges diverging from a corresponding corner; and
   a substantially triangular, hardened insert fastened to each seating surface, forming a cutting tip with a pair of receding cutting edges; and
   each seating surface defining a seat notch at one of the two diverging edges near the intersection with an adjacent divergent edge and each of the inserts including an insert-notch defined in the insert at one of the cutting edges adapted to be aligned with the corresponding seat notch when the insert is installed on the seating surface, the seat-notch and the insert-notch in combination forming a groove for receiving a section of an adjacent insert to permit overlapping of adjacent inserts, thereby providing angled cutting edges about the periphery of the cutting end.

6. A saw tooth as claimed in claim 5, wherein the tooth body comprises a central portion at the cutting end having a central bore extending through the tooth body to the mounting end.

7. A saw tooth as claimed in claim 6, wherein the seating surfaces have a substantially triangular shape with the apex of the triangle at the corner, the central portion of the tooth body comprises four side surfaces defining the base of each triangle, the substantially triangular insert corresponding to each seating surface abutting a corresponding one of the side surfaces of the central portion.

8. A saw tooth as claimed in claim 7, wherein each seat-notch comprises a first surface which is in a plane from an adjacent seating surface, and a second surface which is in a plane projecting from a side surface of the central portion that forms the base of the triangle of the adjacent seating surface.

9. A saw tooth as claimed in claim 8, wherein each insert-notch comprises a first surface and a second surface, the first surface being parallel to and spaced apart from the first surface of a corresponding seat-notch and the second surface being in the same plane as the second surface of the corresponding seat-notch.

10. A saw tooth for a circular saw blade comprising:
    a multi-faceted shaped body having a mounting end, and a larger cutting end and a plurality of sides extending between the mounting end and the cutting end, the sides forming corners at the cutting end where they meet;
    a seating surface on the cutting end at each of the corners, each seating surface sloping inwardly and defined between two edges diverging from a corresponding corner; each diverging edge intersecting an adjacent diverging edge from adjacent another corner so as to form substantially v-shaped edges co-terminus with each side,
    a hardened insert having a flat bottom surface, flat side surfaces and a top surface, the insert being fastened to each seating surface, forming a single cutting tip with a pair of receding cutting edges defined by the intersection of the side surfaces and the top surface, each cutting edge terminating at a side end; and
    each of the inserts including a single insert-notch defined in the insert at one side end while the other side end of the insert is in the form of a side tip formed by the intersection of two side surfaces such that when the inserts are installed on the seating surface, the insert-notch forms a groove for receiving the side tip of an adjacent insert so that adjacent inserts overlap one another and provide angled cutting edges about the periphery of the cutting end.

11. A saw tooth for a circular blade as defined in claim 10 wherein the multi-shaped faceted body has a frusto-pyramidal configuration and the body comprises a central portion at the cutting end having a central bore extending through the tooth body to the mounting end and the seating surfaces have a substantially triangular shape with the apex of the triangle at the corner, the central portion comprises four side surfaces defining the base of each triangle, the insert being substantially triangular to correspond to each seating surface and the insert fastened in each seating surface abutting a corresponding one of the side surfaces of the central portion.

12. The saw tooth as defined in claim 11, wherein each insert-notch comprises a first surface and a second surface, the first surface being parallel to and spaced apart from a projecting plane of the corresponding seating surface and the second surface being in the same plane as the side surface of the central portion corresponding to the adjacent insert.

* * * * *